US 6,716,928 B2
Apr. 6, 2004

(54) GRAFTED PROPYLENE COPOLYMERS AND ADHESIVE BLENDS

(75) Inventor: Maged G. Botros, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/222,568

(22) Filed: Aug. 16, 2002

(65) Prior Publication Data

US 2004/0034166 A1 Feb. 19, 2004

(51) Int. Cl.$^7$ .......... C08L 23/26; C08L 23/16; C08L 51/06
(52) U.S. Cl. .......... 525/285; 525/301; 525/64; 525/74; 525/78; 525/193; 525/242
(58) Field of Search ................ 525/285, 301, 525/64, 74, 78, 193, 242

(56) References Cited

U.S. PATENT DOCUMENTS

| 4,375,531 A | 3/1983 | Ross |
| 5,344,886 A | 9/1994 | Chang et al. |
| 5,344,888 A | 9/1994 | Wild et al. |
| 5,367,022 A | 11/1994 | Kiang et al. |

OTHER PUBLICATIONS

Ross, J.F., et al.:"An Improved Gas–Phase Polypropylene Process," *Ind. Eng. Chem. Res. Dev.* (1985) 24:149–154.

*Primary Examiner*—James J. Seidleck
*Assistant Examiner*—Olga Asinovsky
(74) *Attorney, Agent, or Firm*—Gerald A. Baracka; William A. Heidrich

(57) ABSTRACT

Improved grafted propylene copolymer compositions and adhesive blends containing same are provided. The grafts are obtained by reacting propylene-ethylene impact copolymers having specified rubber contents and molecular weight distributions with ethylenically unsaturated acids or acid derivatives, such as maleic anhydride.

16 Claims, No Drawings

GRAFTED PROPYLENE COPOLYMERS AND ADHESIVE BLENDS

BACKGROUND OF THE INVENTION

1. Field of the Invention

This invention relates to grafted propylene copolymer products and adhesive blends containing same. More particularly, the invention relates to impact propylene-ethylene copolymer grafted with carboxylic acids and derivatives thereof having high graft concentrations at significantly lower melt flow rates (MFRs).

2. Description of the Prior Art

Propylene-based polymers grafted with ethylenically unsaturated carboxylic acids or derivatives are well-known and widely used as adhesive blends for adhesion to one or more polypropylene substrates.

Typically such adhesive blends include the grafted propylene copolymer blended with a propylene homopolymer or an ethylene/propylene copolymer and, optionally, a third component such as a linear low density polyethylene (LLDPE), a hydrocarbon rubber such as ethylene-propylene-diene monomer (EPDM) rubber or ethylene-propylene rubber (EPR), a poly(1-olefin) such as poly (butene-1), or an ethylene polymer such as high molecular weight low density polyethylene (HMW LDPE).

Prior polypropylene-based graft copolymers have been limited in terms of their maximum attainable functionality, i.e., the concentration of grafted acid or derivative, and/or have exhibited unacceptably low viscosity, i.e., high melt flow rates (MFRs). High acid or acid derivative functionalities are desirable in order to obtain acceptable levels of adhesion at desirably low graft copolymer concentrations with the adhesive blends. Furthermore, high MFR propylene copolymers grafts are difficult to process and, if the MFR is sufficiently high, will adversely affect the processing characteristics of the resulting adhesive blend and its adhesion properties.

Due to the inherently difficult process of grafting ethylenically unsaturated acids or acid derivatives to propylene polymers, prior attempts to graft propylene polymers by high temperature thermal grafting techniques in extruders has resulted in maximum grafted acid or derivative concentrations of no more than about 1 to about 1.2 wt. %. Using peroxide or other free radical generating catalysts in the extruder/reactor makes it possible to achieve higher graft contents but results in chain scission, often referred to as "visbreaking," and the production of relatively low molecular weight grafted and ungrafted fragments. The presence of these low molecular weight species produces a corresponding undesirable increase in MFR. While the low molecular weight species can be removed from the grafted reaction product, such as by solvent extraction, such procedures are costly and they result in loss of desired functionality.

The aforementioned problems are well recognized and described in the prior art. For example, U.S. Pat. No. 5,367,022 points out that when polypropylene homopolymer is grafted with maleic anhydride using peroxide to a target grafted anhydride concentration of 2% by weight, the resulting reaction product exiting the extruder reactor contains about 1.5 to 2.2 wt. % grafted monomer. After refining by solvent extraction to remove low molecular weight polymer fragments, the product only contains about 0.6 to about 1.2 wt. % grafted monomer. The reference also states that grafting graft polypropylene backbones with acid or derivative monomers resulted in unacceptably large increases in the melt flow rate of the product as compared to that of the ungrafted polypropylene, principally due to chain scission. It goes on to indicate that polypropylene homopolymer backbones having an initial melt flow rate (MFR) of about 2 to about 5 g/10 min before grafting typically exhibit MFR values on the order of about 1500 g/10 min after grafting with 1 wt. % maleic anhydride and concludes that such MFRs are far too high for economical pelletizing operations.

While it is an object of U.S. Pat. No. 5,367,022 to provide propylene polymers and adhesive blends based thereon having high grafting monomer functionality and relatively low MFRs, the maximum level of maleic anhydride grafted onto the impact copolymer was 2 wt. %. Moreover, at that graft level the MFR of the grafted product was 398 g/10 min, a level generally considered to be unacceptable for commercial processes. In commercial processing operations for adhesive applications it is generally preferred that the grafted product have a MFR less than 300 g/10 min and, more preferably, 250 g/10 min or lower. It is further observed in the examples of the patent that efforts to increase the amount of maleic grafted anhydride by increasing the amount of peroxide catalyst used, had the opposite effect. Not only was the amount of maleic anhydride grafted reduced, the MFR of the product was increased to even higher and more unacceptable levels.

Other references report the use of various coagents in efforts to increase the amount of graft monomer reacted to propylene polymers and increase graft efficiency during the grafting process. Such processes are disclosed in U.S. Pat. Nos. 5,344,886 and 5,344,888. While graft monomer (maleic anhydride) levels as high as 3.47 wt. % are reported using vinyl acetate as a coagent, there is no mention of the MFR of the resulting functionalized products. Furthermore, the reactive nature of the coagents being used virtually assures that all or at least a substantial portion of the coagent is also reacted with the propylene polymer so that the resulting product would have a significantly different structure than functionalized products produced using the graft monomer by itself.

SUMMARY OF THE INVENTION

It is an object of the present invention to produce functionalized propylene polymer products having higher amounts of acid or acid derivative grafted, i.e., reacted to the polymer backbone. It is a further objective to obtain grafted propylene polymers having higher graft contents while maintaining relatively low MFRs. A still further object is to provide improved adhesive blends formulated with the grafted propylene polymers.

These and other objectives are achieved with the present invention wherein it has unexpectedly been found that a select group of propylene impact copolymers can be grafted with olefinically unsaturated carboxylic acid and derivative monomers to produce functionalized products characterized by high grafting monomer functionality and relatively low MFR.

Specifically, the improved grafted propylene copolymers of the invention are grafted impact copolymers comprising a propylene-ethylene impact copolymer characterized by having a relatively narrow molecular weight distribution and comprising a reactor-made intimate mixture of propylene homopolymer and 20 wt. % or more ethylene-propylene copolymer and having at least 1 wt. % grafting monomer selected from the group consisting of ethylenically unsaturated carboxylic acid or acid derivative grafted thereto.

Preferably, said grafted impact copolymer having a graft to melt flow rate ratio of 1 or more.

Especially useful products are obtained using maleic anhydride as the graft monomer. Highly useful grafted products have MWDs of 7 or less and, more preferably, 6 or less. Rubber, i.e., ethylene-propylene copolymer, contents are most advantageously 25 wt. % or greater. The grafted products preferably have MFRs less than 300 g/10 min even at graft levels of 2 to 3 wt. %. The ability to achieve graft to melt flow rate ratios of 1 and above at high graft levels is highly advantageous and unexpected.

Adhesive blends comprised of 0.1 to 25 wt. % of the grafted impact copolymer and up to 99.9 ungrafted polyolefin blending resin are also disclosed. Highly useful adhesive blends contain up to 40 wt. % elastomeric polyolefin. In an especially preferred embodiment of the invention, the adhesive blends contain 0.25 to 15 wt. % grafted impact copolymer and 10 to 30 wt. % ungrafted elastomeric polyolefin with the balance of the composition being an ungrafted propylene polymer.

DETAILED DESCRIPTION OF THE INVENTION

The present invention provides grafted, i.e., functionalized, propylene impact copolymer products characterized by having high graft monomer functionality and relatively low MFR. The products of these invention are produced using conventional peroxide-induced melt grafting procedures and without the use of coagents. Specific types of propylene impact copolymers, which are described in more detail below, are necessarily employed to achieve the improved results.

The grafted products of the invention may be conveniently prepared by melt blending the ungrafted propylene impact copolymers in the substantial absence of a solvent with a free radical generating catalyst, such as a peroxide catalyst, in the presence of the grafting monomer in a shear-imparting reactor, such as an extruder/reactor. Twin screw extruder/reactors such as those marketed by Coperion (formerly Werner-Pfleiderer) under the designations ZSK-53 and ZSK-83 are commonly used.

In one embodiment, peroxide catalyst is introduced to the molten polymeric composition followed by introduction of the grafting monomer. The grafting monomer may be introduced at a slightly higher temperature. The grafting reaction is carried at a temperature selected to minimize or avoid rapid vaporization and consequent losses of the catalyst and monomer. The monomer is typically about 1 to about 5 wt. % based on the total reaction mixture weight.

A temperature profile where the temperature of the polymer melt increases gradually through the length of the extruder/reactor up to a maximum in the grafting reaction zone, and then decreases toward the reactor exit is preferred. Temperature attenuation is desirable for product pelletizing purposes. The maximum temperature within the reactor should be such that significant vaporization losses and/or premature decomposition of the peroxide catalyst are avoided. For example, with di-t-butyl peroxide and 2,5-dimethyl-2,5-di-(t-butylperoxy)hexane, maximum temperatures within the reactor should be maintained at or below about 220° C. In contrast, the so-called "thermal" grafting processes of the prior ail which do not include catalysts, may use temperatures up to about 380° C. The maximum useful temperature varies with the selection of catalyst. Examples of useful peroxide catalysts include: 1,1-bis(tert-butylperoxy)cyclohexane; n-butyl-4,4-bis(tert-butylperoxyvalerate); 1,1-bis(tert-butylperoxy)-3,3,5-trimethylcyclohexane; 2,2-bis(tert-butylperoxy)butane; dicumylperoxide; tert-butylcumylperoxide; αα'-bis(tert-butylperoxypreoxy-isopropyl)benzene; di-tert-butylperoxide (DTBP); 2,5-dimethyl-2,5-di(tert-butylperoxy)hexane; and the like. Since substantial amounts of solvent are to be avoided, the catalyst and monomer are preferably added in neat form to the reactor. Additional details regarding the grafting procedure and reactor extruder are provided in U.S. Pat. No. 5,367,022 which is incorporated herein by reference.

The grafting monomer used is at least one polymerizable, ethylenically unsaturated carboxylic acid or acid derivative, such as an acid anhydride, ester, salt or the like. Such monomers include but are not necessarily limited to the following: acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophthalic anhydride, norborn-5-ene-2,3-dicarboxylic acid anhydride, Nadic anhydride, methyl Nadic anhydride, Himic anhydride, methyl Himic anhydride, and x-methylbicyclo(2.2.1)hept-5-ene-2,3-dicarboxylic acid anhydride(XMNA). Maleic anhydride is a preferred grafting monomer.

The improved functionalized products of the invention having a highly desired balance of high graft monomer content at relatively low MFR are obtained using specific propylene-ethylene impact copolymers, namely, impact copolymers of propylene and ethylene produced using gas-phase, stirred-bed polymerization processes. They are reactor-made intimate mixtures of propylene homopolymer and propylene-ethylene copolymer. More specifically they are produced in two reactors connected in series using high activity supported transition metal catalysts. Propylene homopolymer is produced in the first reactor and then introduced to the second reactor where additional propylene, ethylene, hydrogen and catalyst, as necessary, are metered to produce the intimate physical mixtures which comprise the propylene-ethylene impact copolymers utilized for the invention. Gas phase polymerizations of this type are described in the article by Ross, et al., entitled "An Improved Gas-Phase Polypropylene Process" in *Ind. Ene. Chem. Prod. Res. Dev.* 1985, 24, 149–154, which is incorporated herein by reference.

Propylene-ethylene impact copolymers produced in gas-phase polymerizations of the above types are comprised of crystalline (propylene homopolymer) and amorphous or rubber (ethylene-propylene copolymer) phases.

It has unexpectedly been discovered that by grafting propylene-ethylene impact copolymers having high rubber contents and narrow molecular weight distributions (MWDs) it is possible to obtain grafted copolymers having significantly higher graft contents and lower MFRs than heretofore possible using peroxide-induced melt grafting procedures. To achieve these improved results, propylene-ethylene impact copolymers having rubber contents of 20% or greater and MWDs of 7 or below are employed. It is even more preferable when propylene-ethylene impact copolymers with rubber contents of 25% or more and MWDs of 6 or below are grafted. Especially useful grafted products are obtained when impact copolymers of these types are grafted with maleic anhydride.

While grafted products having lower graft levels and graft to MFR ratios can also be produced using the above-identified impact copolymers, the primary advantage is the ability to consistently and easily produce grafted products having higher functionality but with MFRs heretofore generally associated with grafted materials having much lower values. This, of course, makes it possible for the end user to use less of the functionalized material in adhesive blends resulting in considerable economic benefit. In general, the products of the invention will have at least 1 wt. % of the acid or acid derivative grafted. More typically the graft monomer will constitute 1.75 to 3.5 wt. % and, more preferably, 2 to 3 wt. % of the grafted impact copolymer.

By using the higher rubber content, narrower MWD propylene-ethylene copolymers, it is possible to consistently obtain graft to MFR ratios of 1 or more products having greater than 2 wt. % ethylenically unsaturated carboxylic acid or derivative grafted. The graft to MFR ratio, abbreviated G/M, is determined using the formula:

$$G/M = (\text{weight percent monomer grafted} \div MFR) \times 100$$

For example, a grafted product having 2 wt. % maleic anhydride grafted and an MFR of 20 would have a G/M ratio of 10. As used herein, the terms graft, grafted and grafting denote covalent bonding of the monomer to the propylene-ethylene copolymer chain. MFRs referred to herein are determined by extrusion plastometer in accordance with ASTM D 1238.

Whereas with prior art products it has been possible to obtain G/M ratios greater than 1 at graft levels less than 1.5 wt. %, G/M ratios typically decreased to fractional values as the graft content was increased. For example, with the impact copolymer grafts reported in U.S. Pat. No. 5,367,022 (Products I, J, K, L and M) graft levels of 1.37 to 2 wt. % are reported. However, only the lowest graft content product, Product M with a maleic anhydride content of 1.37 wt. % had a G/M ratio greater than 1. These grafted products were prepared using an impact copolymer having an ethylene content of 12–15 weight percent. This impact copolymer (Quantum PP-1510) upon analysis was shown to have a rubber content of only 17 wt. % and MWD of 9.3. As graft contents of the reference products were increased, there was a corresponding increase in MFR so that G/M ratios dropped to 0.89 and below. The highest graft content product, Product J with a maleic anhydride content of 2 wt. %, had a G/M ratio of only 0.5. In contrast, a typical product of the invention having a maleic anhydride content of about 2 wt. % has a G/M ratio of about 2.5. With the products of the invention, even at maleic anhydride contents of approximately 3 wt. %, G/M ratios greater than 1 are still obtained. This clearly demonstrates the unexpected improvement achieved with the products of the invention, i.e., the ability to achieve high graft contents at relatively low MFRs.

The improved products of the invention are useful for bonding propylene polymers to a variety of substrates including polyesters, nylon, ethylene-vinyl alcohol copolymers, metals and the like. They are typically employed in adhesive blends comprising the grafted propylene-ethylene impact copolymers of the invention with one or more ungrafted polymers most typically, but not necessarily limited to, polyolefins. The adhesive blend can contain 0.1 to 25 wt. % of the grafted product. More preferably, the grafted impact copolymer will comprise 0.25 to 15 wt. % of the adhesive blend. The balance of the adhesive blend comprises the ungrafted polyolefin product (s). The concentration of the graft monomner, i.e., ethylenically unsaturated carboxylic acid or derivative, in the adhesive blend is preferably in the range of about 0.01 to about 1 wt. %.

Thus, the adhesive blend may be characterized as comprising about 0.1 wt. % to about 25 wt. % of the grafted propylene-ethylene impact copolymer, up to 99.9 wt. % of an ungrafted polyolefin blending resin, a portion of which can be an ungrafted elastomeric polyolefin. The adhesive blends are preferably prepared by melt compounding the components with the usual additives (e.g., antioxidants, etc.) and pelletizing the blended material.

Ungrafted polyolefin blending resins may be ungrafted propylene polymers, preferably selected from propylene homopolymers, statistical copolymers of propylene and up to about 30 wt. % of ethylene or a $C_4$–$C_6$ 1-olefin comonomer, or impact or "modified impact" (sometimes referred to in the art as "super impact") propylene-ethylene copolymers. Impact copolymers useful as blending resins in the adhesive blends of the invention include the so-called TPOs or TPOEs. Modified impact copolymers useful as blending resins in the adhesive blends of the invention comprise blends of an impact copolymer and an ethylene polymer, and preferably comprise a blend of between about 95 wt. % and about 70 wt. % of (A) an impact copolymer selected from the group consisting of (a) reactor-made intimate mixtures of polypropylene and statistically oriented copolymers of propylene and ethylene, and (b) blends of polypropylene and statistically oriented copolymers of propylene and ethylene, and between about 5 wt. % and about 30 wt. % of (B) an ethylene polymer. The ethylene polymer is preferably selected from the group consisting of ethylene homopolymers, low density polyethylene (LDPE), ethylene-acid copolymers (e.g., ethylene-acrylic acid copolymer), ethylene-vinyl acetate copolymers, ethylene-acrylate copolymers, such as high density polyethylene (HDPE), linear low density polyethylene (LLDPE), so-called very low density polyethylene (VLDPE), so-called ultra low density polyethylene (ULDPE), and blends thereof. Visbroken modified impact polymeric blends and means for preparing them are described in detail in Ross U.S. Pat. No. 4,375,531 (Mar. 1, 1983), the disclosure of which is incorporated herein by reference.

A portion of the ungrafted polyolefin used for the adhesive blend can be an elastomeric polyolefin. The adhesive blends can contain up to about 40 wt. % (based on total blend) elastomeric polyolefins such as ethylene/propylene rubber (EPR) or ethylene-propylene-diene monomer (EPDM) rubber. Especially useful adhesive blends contain 10 to 30 wt. % elastomeric polyolefin.

The grafted products of the invention may also be used as compatibilizing agents when blending two or more dissimilar resins. The grafted products of the invention may also be used as coupling agents for filled polyolefins such as polypropylene filled with glass fibers, mineral fillers, wood, flour and the like.

The following examples merely illustrate the invention. Those skilled in the art will recognize many variations that are within the spirit of the invention and scope of the claims.

EXAMPLE 1

A series of grafted propylene-ethylene impact copolymers having graft contents (maleic anhydride) ranging from 0.56 to 2.96 wt. % were prepared in accordance with the invention. All of the resulting grafted products had graft to melt flow rate ratios greater than 1.

The propylene-ethylene impact copolymer used contained 14.8 wt. % ethylene and had an MFR of 1 g/10 min. The impact copolymer was comprised of a crystalline phase (isotactic polypropylene homopolymer) and a rubbery phase (EPR). The impact copolymer contained approximately 30 wt. % ethylene-propylene copolymer (EPR). The MWD (Mw/Mn) of the impact copolymer was 5.

Grafting was carried out in a Werner-Pfleiderer Model ZSK-53 twin-screw extruder/reactor having five heated zones (Z1–Z5) with screen changer and die plate (Z6) and associated polymer pellet feed and reactant supply metering equipment. The reactor/extruder was connected to an underwater pelletizer. Temperatures in the various zones were as follows: Z1 164° C.; Z2 174° C.; Z3 183° C.; Z4 186° C.; Z5 220° C. and Z6 200° C. Screw speed was maintained at 255 rpm and reactor throughput was approximately 80 lb/hr. Organic peroxide catalyst feed rate was controlled to achieve the desired graft levels. The graft monomer was maleic anhydride charged to the reactor at a 3 wt. % level, based on the propylene polymer feed rate, and the organic peroxide was LUPEROX 101 (2,5-dimethyl-2,5-di(t-butylperoxy)hexane). To demonstrate the ability to vary the products produced, catalyst feed rate was varied and results of the eight products (identified as products 1A–1H) are reported in Table 1. The table sets out the amount of peroxide used. The MFR (and where appropriate the MMI from which the MFR is calculated) and the graft to MFR ratio (G/M) are also provided. The amount of maleic anhydride grafted was determined by FTIR.

TABLE 1

| Product | Peroxide (wt. %) Charged | Grafted MAH (wt. %) | MMI | MFR (g/10 min) | G/M |
|---|---|---|---|---|---|
| 1A | 0.05 | 0.56 | ND* | 8.7 | 6.4 |
| 1B | 0.11 | 1.293 | ND* | 35.1 | 3.7 |
| 1C | 0.19 | 1.734 | 0.37 | 50** | 3.5 |
| 1D | 0.25 | 2.06 | 0.61 | 82** | 2.5 |
| 1E | 0.42 | 2.534 | 1.29 | 173** | 1.5 |
| 1F | 0.48 | 2.711 | 1.57 | 211** | 1.3 |
| 1G | 0.55 | 2.786 | 1.78 | 239** | 1.2 |
| 1H | 0.61 | 2.86 | 1.97 | 264** | 1.1 |

*not determined
**calculated MFR = 134 MMI + 0.4267

It is apparent from the data presented in the table that high graft levels are possible using the high rubber content narrow MWD propylene-ethylene impact copolymers of the invention while retaining relatively low MFRs. In all instances G/M ratios greater than 1 were achieved. This is particularly significant at graft levels above 2 wt. % and especially at graft levels of 2.5 wt. % and above. This result is surprising based on the results reported in U.S. Pat. No. 5,367,022 which utilize an impact copolymer having a lower rubber content and broader MWD. The grafted impact copolymer products reported in that patent had graft levels ranging from 1.37 to only 20 wt. % and only with the product having the lowest graft level, i.e., 1.37 wt. %, was the graft to MPR ratio greater than 1. As the amount of grafted maleic anhydride was increased with the prior art products, there was a rapid and significant corresponding increase in MFR and all of the products having grafted maleic anhydride contents from 1.59 to 20 wt. % had fractional G/M ratios. Specifically, the product with 1.59 wt. % grafted MAH had a G/M ratio of 0.89 while the G/M ratios of the products with 1.74, 1.81 and 20 wt. % grafted MAH had respective G/M ratios of 0.41, 0.50 and 0.50.

EXAMPLE 2

Example 1 was repeated except that the extruder/reactor conditions were varied. Temperatures in the various zones were as follows: Z1 177° C.; Z2 182° C.; Z3 188° C.; Z4 201° C.; Z5 212° C. and Z6 200° C. All other conditions and reactants were the same as in Example 1. Results of the eight runs are set forth in Table 2 which follows.

TABLE 2

| Product | Peroxide (wt. %) Charged | Grafted MAH (wt. %) | MMI | MFR (g/10 min) | G/M |
|---|---|---|---|---|---|
| 2A | 0.05 | 0.428 | ND* | 7.5 | 5.7 |
| 2B | 0.11 | 0.771 | ND* | 22 | 3.5 |
| 2C | 0.19 | 1.91 | 0.435 | 59** | 3.2 |
| 2D | 0.25 | 2.21 | 0.65 | 88** | 2.5 |
| 2E | 0.41 | 2.571 | 1.29 | 173** | 1.5 |
| 2F | 0.48 | 2.73 | 1.44 | 193** | 1.4 |
| 2G | 0.55 | 2.911 | 1.74 | 234** | 1.2 |
| 2H | 0.62 | 2.85 | 2.01 | 270** | 1.1 |

*not determined
**calculated MFR = 134 MMI + 0.4267.

All of the grafted products had MFRs well below that generally considered undesirable for adhesive commercial applications, i.e., MFR 300. Moreover, all of the grafts produced in this example using the high rubber content, narrow MWD propylene-ethylene impact copolymer had G/M ratios greater than 1. When the process is repeated using propylene-ethylene impact copolymers having rubber contents less than 20 wt. % and MWDs greater than 7, it is possible only at low graft levels to achieve acceptable MFRs. As graft contents are raised above about 1.5 wt. %, MFRs are increased to undesirable levels and fractional G/M ratios are obtained.

EXAMPLE 3

To demonstrate the superior results obtained using the improved impact copolymer grafts of the invention, adhesive blends were prepared using the grafted products of Examples 1 and 2 and compared with an adhesive blend obtained using the prior art graft produced from an impact copolymer having lower rubber content and broader MWD. All of the adhesive blends contained 8 wt. % of the grafted material, 20 wt. % EPR rubber (BUNA®EPT 2070P containing 68 wt. % ethylene and having a Mooney viscosity ML (1+8) @ 100° C. of 35), and 72 wt. % random propylene-ethylene copolymer (3 wt. % ethylene; MFR 1.85 g/10 min). Adhesive blend 3A contained 8 wt. % 2H and adhesive blend 3B contained 8 wt. % 1H. Comparative adhesive blend 3C contained 8 wt. % of the graft (Product J from U.S. Pat. No. 5,367,022) prepared from an impact copolymer of the prior art containing 12.2 wt. % ethylene and having a rubber content of 17 wt. % and MWD of 9.3. The grafted product contained 2 wt. % maleic anhydride.

Each of the blends were utilized to make a 5-layer, 5 mil thick PP/adhesive/EVOH/adhesive/PP film. The films were produced on a Killion coextrusion line. The melt temperatures of the components were 394° F. for the adhesive blends, 420° F. for the PP and 430° F. for the EVOH. The PP used was a polypropylene homopolymer having a MFR of 5. The EVOH was a commercially available resin (Soarnol®DC3203F) having an ethylene content of 32 wt. % and MFR of 3.2.

Adhesion of the PP to the EVOH was evaluated after 1 day, 4 days and 14 days using ASTM D 1876-01. Results obtained using the various adhesive blends were as follows:

|  | 1 day | 4 days | 14 days |
| --- | --- | --- | --- |
| Inventive Adhesive Blend A | 2.48 | 2.84 | 3.0 |
| Inventive Adhesive Blend B | 2.71 | 2.88 | 3.0 |
| Comparative Adhesive Blend C | 0.35 | 0.41 | 0.31 |

All of the adhesion results reported above in lbs/in are the average of 3 trials. It is apparent from the above data that superior adhesion is obtained with the films prepared using the adhesive blends of the invention.

I claim:

1. A grafted propylene copolymer comprising a reactor-made propylene-ethylene impact copolymer which is an intimate mixture of propylene homopolymer and 20 weight percent or more ethylene-propylene copolymer and having a molecular weight distribution of 7 or less grafted with at least 1 weight percent ethylenically unsaturated carboxylic acid or acid derivative grafting monomer and wherein the graft to melt flow rate ratio is 1 or above.

2. The grafted propylene copolymer of claim 1 wherein the propylene-ethylene impact copolymer is produced in a gas-phase, stirred-bed polymerization process using a high activity supported transition metal catalyst.

3. The grafted propylene copolymer of claim 2 wherein propylene homopolymer is produced in a first reactor and then introduced to a second reactor where ethylene and propylene are copolymerized.

4. The grafted propylene copolymer of claim 1 wherein the grafting monomer is maleic anhydride.

5. The grafted propylene copolymer of claim 4 having 1.75 to 3.5 weight percent maleic anhydride grafted.

6. The grafted propylene copolymer of claim 4 having a melt flow rate less than 300 g/10 min.

7. The grafted propylene copolymer of claim 5 wherein the propylene-ethylene impact copolymer has a molecular weight distribution of 6 or less and the ethylene-propylene copolymer is present in an amount of 25 weight percent or more.

8. The grafted propylene copolymer of claim 7 having 2 to 3 weight percent maleic anhydride grafted.

9. The grafted propylene copolymer of claim 5 having a melt flow rate of 250 g/10 min or less.

10. An adhesive blend comprising:

(a) 0.1 to 25 weight percent grafted propylene copolymer comprising a reactor-made propylene-ethylene impact copolymer which is an intimate mixture of propylene homopolymer and 20 weight present or more ethylene-propylene copolymer and having a molecular weight distribution of 7 or less grafted with at least 1 weight percent ethylenically unsaturated carboxylic acid or acid derivative grafting monomer and wherein the graft to melt flow rate ratio is 1 or above; and (b) 75 to 99.9 weight percent ungrafted polyolefin blending resin.

11. The adhesive blend of claim 10 wherein said blending resin contains up to about 40 weight percent, based on the total weight of the blend, ungrafted elastomeric polyolefin.

12. The adhesive blend of claim 11 wherein the ungrafted elastomeric polyolefin is ethylene-propylene rubber.

13. The adhesive blend of claim 10 wherein the ungrafted polyolefin blending resin is an ungrafted propylene polymer.

14. The adhesive blend of claim 13 wherein the grafted propylene copolymer has a molecular weight distribution of 6 or below, melt flow rate less than 300 g/10 min and contains 1.75 to 3.5 weight percent grafted maleic anhydride.

15. The adhesive blend of claim 13 wherein said ungrafted propylene polymer is selected from the group consisting of propylene homopolymers, statistical copolymers of propylene and up to 30 weight percent ethylene or $C_{1-6}$ 1-olefin comonomer and impact or modified impact propylene-ethylene copolymers.

16. The adhesive blend of claim 11 which contains 0.25 to 15 weight percent grafted impact copolymer and 10 to 30 weight percent ungrafted elastomeric polyolefin.

* * * * *